United States Patent [19]

Brück et al.

[11] Patent Number: 5,382,774
[45] Date of Patent: Jan. 17, 1995

[54] ELECTRICALLY HEATABLE HONEYCOMB BODY

[75] Inventors: Rolf Brück, Bergisch; Hans-Jürgen Breuer, Overath, both of Germany

[73] Assignee: Emitec Gesellschaft fuer Emissions-technologie mbh, Lohmar, Germany

[21] Appl. No.: 135,265

[22] Filed: Oct. 12, 1993

[30] Foreign Application Priority Data

Apr. 10, 1991 [DE] Germany ............................ 4111712

[51] Int. Cl.⁶ .............................................. H05B 3/10
[52] U.S. Cl. ..................................... 219/553; 219/548
[58] Field of Search ............... 217/552, 553, 528, 529, 217/548, 549; 392/485, 486, 490, 494; 338/288, 289

[56] References Cited

U.S. PATENT DOCUMENTS

| | | | |
|---|---|---|---|
| 3,032,635 | 5/1962 | Kraft | 219/553 |
| 3,265,865 | 8/1966 | Hager | 219/549 |
| 3,770,389 | 10/1973 | Kitzner | 392/488 |
| 3,995,143 | 11/1976 | Hervert | 219/553 |
| 4,205,118 | 5/1980 | Schubert | 428/594 |
| 5,063,029 | 11/1991 | Mizuno | 219/552 |
| 5,140,812 | 8/1992 | Cornelison | 60/300 |
| 5,202,547 | 4/1993 | Abe | 219/552 |
| 5,288,975 | 2/1994 | Kondo | 219/552 |

FOREIGN PATENT DOCUMENTS

| | | |
|---|---|---|
| 0035053 | 9/1981 | European Pat. Off. |
| 0245736 | 8/1989 | European Pat. Off. |
| 0245737 | 8/1989 | European Pat. Off. |
| 8812924 | 11/1989 | Germany |
| 8910470 | 11/1989 | WIPO |
| 8910471 | 11/1989 | WIPO |
| 9003220 | 4/1990 | WIPO |

Primary Examiner—Teresa J. Walberg
Attorney, Agent, or Firm—Herbert L. Lerner; Laurence A. Greenberg

[57] ABSTRACT

An electrically heatable honeycomb body includes an axis, an inner region surrounding the axis, and an outer region spaced apart from the axis. At least one stack has at least one sheet metal layer and is disposed between the inner region and the outer region. The stack is wound in the form of a spiral with a multiplicity of windings around the inner region. The windings include a plurality of windings being adjacent one another and spaced apart from one another and electrically insulated, in pairs. A multiplicity of bridges each mechanically and electrically connect together a respective two of the adjacent and spaced-apart windings. The windings and the bridges form a multiply branched current path for an electrical current flowing between the inner region and the outer region. Each of the windings is completely part of the current path.

16 Claims, 5 Drawing Sheets

ELECTRICALLY HEATABLE HONEYCOMB BODY

CROSS-REFERENCE TO RELATED APPLICATION

This application is a continuation of International Application Serial No. PCT/EP92/00701, filed Mar. 30, 1992.

BACKGROUND OF THE INVENTION

Field of the Invention

The invention relates to an electrically heatable honeycomb body, having an axis, an inner region surrounding the axis, an outer region spaced apart from the axis, and at least one stack including at least one sheet metal layer being disposed between the inner and the outer regions and being wound in the manner of a spiral, with a multiplicity of windings, around the inner region.

Such honeycomb bodies, that are made up of stacks of sheet metal layers which are wound or intertwined, are described in Published European Application No. 0 245 736 B1; Published European Application No. 0 245 737 B1, corresponding to U.S. Pat. Nos. 4,832,998 and 4,923,109; and Published International Application WO 90/03220 A1. The use of such honeycomb bodies as carriers for catalysts, especially for use in motor vehicle exhaust systems to eliminate pollutants from the exhaust gases of the internal combustion engines driving the motor vehicles, is explained in detail in those references. An especially advantageous feature of a metal honeycomb body as a carrier for a catalyst is the provision of a direct electrical heating, since a typical catalyst, for converting pollutants in engine exhaust gas, does not develop its effectiveness until temperatures above approximately 200° C. so that it does not become active until a delay of possibly several minutes, after it has begun to be acted upon by exhaust gas. Heating is therefore extremely desirable in order to speed up the activation of a catalyst, especially a catalyst in a motor vehicle exhaust system. As such, in the case of a metal honeycomb body, direct electrical heating is especially attractive, in which the honeycomb body would be acted upon by electric current, for example from the battery of the motor vehicle having the exhaust system in which the honeycomb body is installed. However, depending on the model, the electrical resistance of a honeycomb body to be installed in an exhaust gas system, of the type described in the aforementioned references, is at most approximately one-hundredth of an ohm. Such a honeycomb body cannot be connected to a typical motor vehicle battery without straining the battery in an unacceptable way. In view of such problems, provisions have already been considered for increasing the electrical resistance of a honeycomb body and in particular arriving at the use in motor vehicles of honeycomb bodies that can be adequately heated within short time periods without unacceptably straining the sources of electrical energy that are typically available. Accordingly, Published International Applications WO 89/10470 A1 and WO 89/10471 A1 describe subdividing a honeycomb body with gaps and/or electrically insulating partitions in such a way that at least one electrical current path through the honeycomb body, with an electrical resistance of the desired order of magnitude, particularly approximately 0.1 Ohm, is produced. However, the solutions to the problem of electrical resistance described in the two references may possibly lead to difficulties, if the honeycomb body to be electrically heated is intended to withstand severe mechanical strains. In that case, the ceramic layers and above all the gaps that are possibly to be provided between the individual sheet-metal layers or windings mean that connection points between the sheet metal layers in the honeycomb bodies must be left out, thereby loosening its structure and possibly reducing its rigidity. The capacity of such a honeycomb body to withstand vibration and the like may be limited in comparison with otherwise identical honeycomb bodies that are not constructed for electrical heating.

SUMMARY OF THE INVENTION

It is accordingly an object of the invention to provide an electrically heatable honeycomb body, that is an electrically conductive honeycomb body with an electrical resistance of a practicable order of magnitude, which overcomes the hereinafore-mentioned disadvantages of the heretofore-known devices of this general type and which has a stronger structure and therefore an improved durability under severe mechanical strains, in comparison with the heatable honeycomb bodies of the prior art.

With the foregoing and other objects in view there is provided, in accordance with the invention, an electrically heatable honeycomb body, comprising an axis, an inner region surrounding the axis, and an outer region spaced apart from the axis; at least one stack having at least one sheet metal layer and being disposed between the inner region and the outer region, the stack being wound in the form of a spiral with a multiplicity of windings around the inner region, the windings including a plurality of windings being adjacent one another and spaced apart from one another and electrically insulated, in pairs; a multiplicity of bridges each mechanically and electrically connecting together a respective two of the adjacent and spaced-apart windings; the windings and the bridges forming a multiply branched current path for an electrical current flowing between the inner region and the outer region, and each of the windings being completely part of the current path.

In the honeycomb body according to the invention, in addition to the connections formed in the stack by the technique known in the industry, there are also bridges between adjacent windings of the stack. Such bridges, which may, for example, be brazing points or the like and can optionally be produced by special components inserted between the windings and secured by brazing, diffusion welding, sintering or some similar joining technique, do form a branched path of the electric current through the honeycomb body, so that a reduced electrical resistance results for it in comparison with a honeycomb body lacking bridges. However, it has maximum possible mechanical strength and a maximally electrical resistance of the current path present in the honeycomb body. It is possible in fact to stabilize the honeycomb body by means of a number of mechanical and electrical connections in the form of the aforementioned bridges between various windings of the stack, without unacceptably lowering the electrical resistance of the current path. Depending on the disposition of the bridges, some slight lack of homogeneity in the imposition of electric current upon the honeycomb body and therefore a non-homogeneous temperature distribution in the heating may result. However, this non-homogeneity has no major disadvantages, since heat conduction and heat radiation have a compensating effect the honeycomb body, and above all the catalyzed reaction that takes place in the honeycomb body after the activation of the catalyst makes for homogeneous temperature distribution within a short time, largely independently of non-homogeneity in the initial activation. The problem of non-homogeneity is thus essentially limited to very brief periods of time after the onset of action on the honeycomb body by the fluid in which the reaction is to be catalyzed.

The invention avoids individual segments of the windings being cut off from the flow of electric current and thereby not being part of the current path. This is especially advantageous in order to avoid major non-homogeneities in the temperature distribution resulting from the heating.

In accordance with another feature of the invention, there are provided at most two bridges between each two adjacent, spaced-apart windings, in each angular region less than 360°, measured around the axis. In many configurations of bridges, the electric current not only flows around the axis in one of the two possible directions of rotation, but instead currents in both rotational directions occur in the windings joined by the bridges. Accordingly, if more than two bridges are provided in the aforementioned angular region of less than the full angle, then a segment of a winding located between two of the three bridges might possibly be completely by-passed and cut off from the flow of electric current. Moreover, it should be pointed out that particularly in every angular region, measured around the axis, that is less than 360°, the term "adjacent windings" is always well-defined, because in fact in such an angular region, windings located next to one another and spaced apart from one another in the stack have no connections with one another, aside from possible bridges. The term "adjacent" as used in the sense of the invention should be understood from this standpoint.

In accordance with a further feature of the invention, the sum of each two angular spacings immediately succeeding one another is between approximately 480° and approximately 600°, but at least one of two angular spacings immediately succeeding one another is not greater than 240°. The action of electric current on the honeycomb body of the invention for heating purposes, which is largely uniform except for locally limited, relatively slight non-homogeneity, can in particular be attained in this way. This pertains to a honeycomb body according to the invention to which the current is delivered in the outer region and is withdrawn in the inner region. In order to provide adequately homogeneous heating of the honeycomb body, it is also necessary to deliver the electric current to the side of the honeycomb body diametrically opposite the input point. This is unattainable if the bridges or connections are located too close together. In that event, the current passes merely through a comparatively narrowly defined area around the direct connecting line between the input and the output point and uniform heating can no longer be said to occur.

In accordance with an added feature of the invention, each angular spacing in the honeycomb body of the invention is greater than approximately 120°. An overly major reduction in the angular spacing between two adjacent bridges always means that more or less large segments of windings are cut off from the flow of current, making the homogeneity of the heating unsatisfactory.

In accordance with an additional feature of the invention, all of the angular spacings are approximately equal to one another, and each such spacing is approximately 240°. In this way, the honeycomb body forms an especially strongly interlinked configuration of electrical resistors for the electric current (one segment of the stack between two bridges corresponds to each resistor), and as a result adequate homogeneity of heating is assured.

In accordance with yet another feature of the invention, there is provided a first angular spacing between approximately 120° and approximately 240°, and a second angular spacing of approximately 360°, which occur in alternation.

In accordance with yet a further feature of the invention, the first angular spacing is approximately 180°. In other words, in this case the result is an essentially uniform imposition of electric current upon the windings. If the first angular spacing differs substantially in amount from 180°, then naturally certain non-homogeneities occur. However, limiting the first angular spacing to between approximately 120° and approximately 240°, assures adequate homogeneity.

In accordance with yet an added feature of the invention, the bridges between the windings of the stack in the honeycomb body of the invention are strip-shaped and parallel to the axis. The strip form may be achieved either with actually axially lengthened bridges or, with adequate effectiveness, by configurations of substantially axially successive, more or less dot-shaped connecting points. The bridges need not necessarily all penetrate the entire honeycomb body in the axial direction. For instance, the bridges may remain limited to an axial portion of the honeycomb body that is to be heated to a particular extent either alone or along with other portions. Moreover, by using an axially stepped configuration of the bridges, adequate structuring of the current path, thereby further increasing its electrical resistance, can be attained.

In accordance with yet an additional feature of the invention, there are provided insulating layers of ceramic material or the like inserted between adjacent, spaced-apart windings. Such insulating layers not only offer reliable insulation of the windings from one another but also contribute substantially to stabilizing the honeycomb body to withstand vibration strains and the like.

In accordance with again another feature of the invention, there are provided sheet-metal strips inserted between the insulating layers, in order to form the bridges between adjacent windings, so that a layer formed alternatingly of metal and insulator and preferably being of constant thickness comes to rest between the windings of the honeycomb body. This provision likewise contributes substantially to increasing the capacity of the honeycomb body to withstand mechanical strains.

In accordance with again a further feature of the invention, the insulating layers are in the form of a ceramic coating on at least one sheet metal layer forming and defining the stack. Considering the usual electrical voltages used to heat a honeycomb body, which as a rule are approximately V, it is possible to achieve an insulating layer with adequate insulation and with an especially slight thickness by ceramic coating of a sheet metal layer. Therefore, the insulating layer does not substantially limit the volume the honeycomb body, which is advantageous in terms of the strength of the latter and which leaves its hydrodynamic resistance to fluid flowing through it, particularly exhaust gas, unchanged from the usual, very low value.

In accordance with again an added feature of the invention, without hindrance to any possible additional embodiment, the honeycomb body is defined in the direction of the axis by two approximately plane, flat or planar end surfaces located approximately perpendicular to the axis, and the outer region has an approximately cylindrical jacket surface located between the end surfaces and being oriented approximately parallel to the axis, having an encompassing groove in the jacket surface approximately halfway between the end surfaces, the groove extending into the honeycomb body as far as the inner region. The honeycomb body thus has two outer regions and two stacks substantially separate from one another, which are each located in succession as viewed in the direction of the axis and are joined together mechanically and electrically through a single inner region. In such a honeycomb body, the input and output of electric current can be provided in each case at an outer region. After being input into a first outer region, the electric current passes through a first stack, flows through the inner region into the second stack, and after passing through it reaches the second outer region, where it is output. In the context of this feature of the invention, the provision of an input or output contact at the inner region of the honeycomb body is dispensable. Therefore in particular all of the disadvantages associated with a contact to be provided on the inner region of the honeycomb body, and which might result in high strain from the fluid flowing through the honeycomb body, are in particular eliminated.

In accordance with a concomitant feature of the invention, all of the windings in the honeycomb body that are adjacent to one another are also spaced apart from one another. In this way, it is possible to attain an especially high electrical resistance, while assuring mechanical strength, by means of the bridges according to the invention.

Other features which are considered as characteristic for the invention are set forth in the appended claims.

Although the invention is illustrated and described herein as embodied in an electrically heatable honeycomb body, it is nevertheless not intended to be limited to the details shown, since various modifications and structural changes may be made therein without departing from the spirit of the invention and within the scope and range of equivalents of the claims.

The construction and method of operation of the invention. however, together with additional objects and advantages thereof will be best understood from the following description of specific embodiments when read in connection with the accompanying drawings.

DESCRIPTION OF THE PREFERRED EMBODIMENTS

Figure 1:
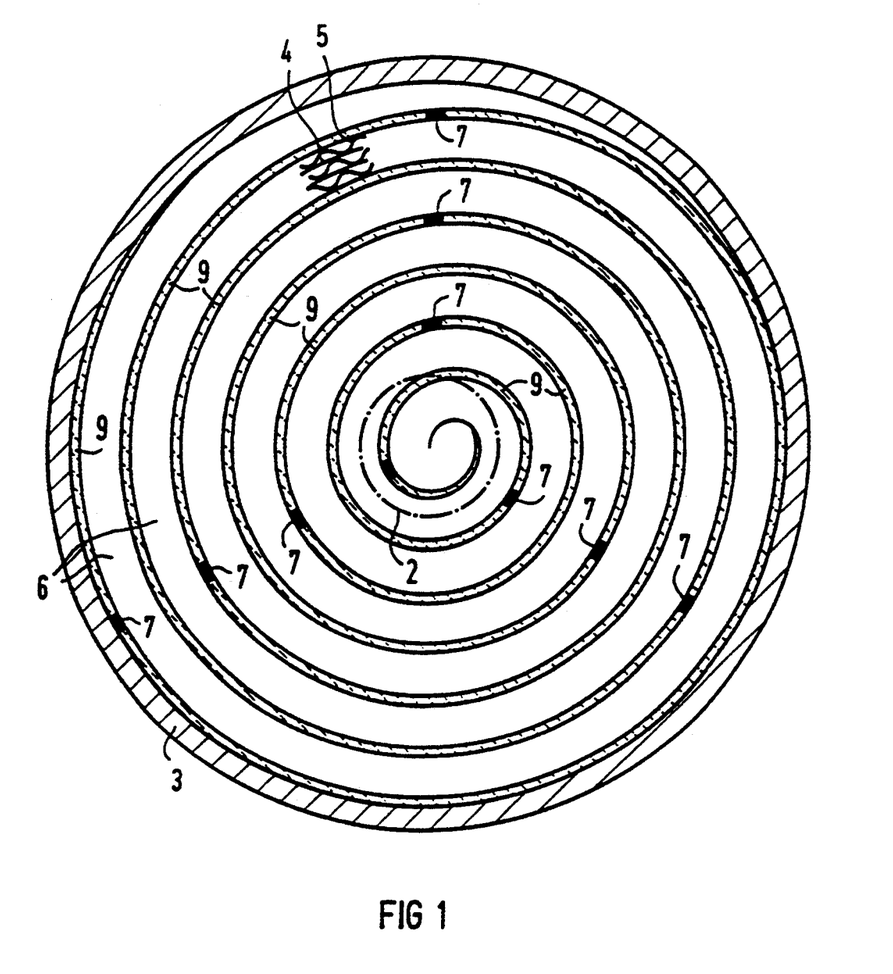
FIG. 1 is a diagrammatic, cross-sectional view of a honeycomb body according to the invention.

Referring now in detail to the figures of the drawing, which show exemplary embodiments of the invention in diagrammatic and/or slightly distorted form where it is useful to explain specific characteristics of the invention, and first, particularly, to FIG. 1 thereof, there is seen a cross section taken at right angles to a non-illustrated axis of a honeycomb body according to the invention. The honeycomb body is formed of a stack 6 of smooth sheet metal layers 4 and corrugated sheet metal layers 5, which is wound with a number of windings about the axis (which may be imagined to be located in the middle of the honeycomb body). In the interior of the honeycomb body, the stack 6 ends in an inner region 2. On the outside the honeycomb body is bounded by an outer region 3, which in particular may be constructed as a jacket tube into which the multiply wound stack 6 is inserted. Electrical current for heating the honeycomb body flows essentially along the windings of the stack 6 from the inner region 2 to the outer region 3, or in the opposite direction. In order to ensure that the electric current will take the course of the windings of the stack 6, each two adjacent windings are spaced apart from one another and electrically insulated from one another by insulating layers 9. The insulating layers 9 may be formed of ceramic material, or may simply be gaps between the individual windings. According to the invention, the insulating layers 9 are interrupted by bridges 7, which represent metal connections between the individual windings of the stack 6. These bridges 7 serve primarily to strengthen the mechanical structure of the honeycomb body, as has already been explained at length. Moreover, the bridges 7 represent electrical connections between adjacent windings of the stack 6. The disposition of the bridges 7 according to the invention assures that they will not present substantial hindrances to the adequately homogeneous heating of the honeycomb body by the electric current, and moreover will not unacceptably lower the electrical resistance of the current path formed in the honeycomb body for the electric current. In the exemplary embodiment of FIG. 1, the bridges 7 are disposed in such a way that two adjacent bridges 7 along the insulating layer 9 each have an angular spacing, measured around the axis, of approximately 240°. The current path formed in this way represents an especially strongly branched network of electrical resistors, as a result of which the adequately homogeneous heating of the honeycomb body can be assured. Moreover, the configuration of bridges 7 along three lines leading radially outward from the axis produces an especially efficient strengthening of the structure of the honeycomb body.

Figure 2:
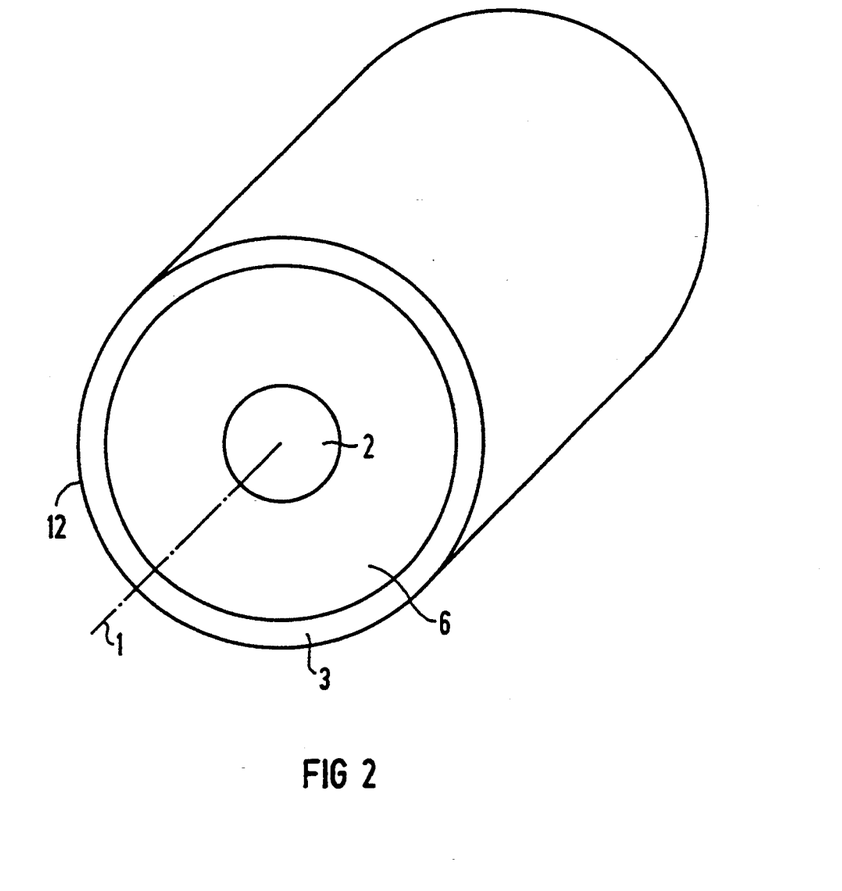
FIG. 2 is a reduced perspective view of one example of an external shaping of a honeycomb body.

FIG. 2 shows a perspective view from the outside of a honeycomb body as it might appear in accordance with the invention. The honeycomb body is cylindrical, and an axis 1 is shown as a center line. The inner region 2 of the honeycomb body is a likewise approximately cylindrical region that immediately surrounds the axis 1. The inner region 2 is adjoined by the wound stack 6, which is bounded by the outer region 3. An end surface 12 of the honeycomb body, that is the surface from which the axis 1 emerges, is substantially planar and is located at right angles to the axis 1.

Figure 3:
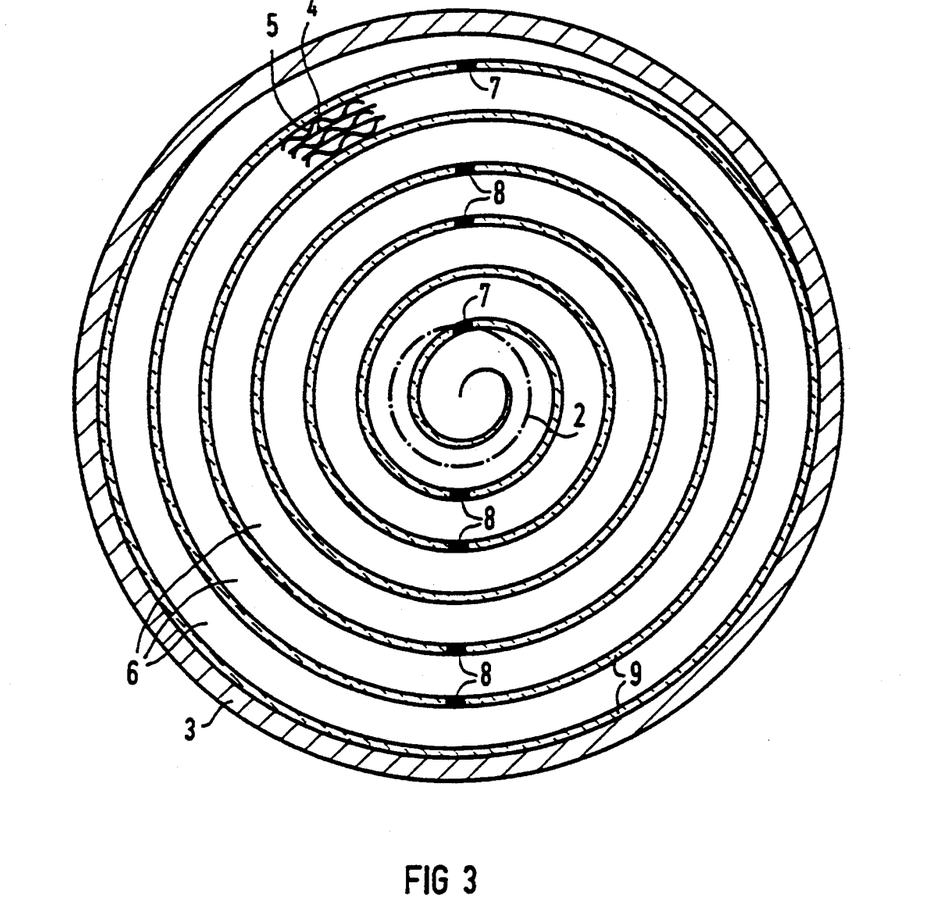
FIG. 3 is a cross-sectional view of a further embodiment of the honeycomb body of the invention.

FIG. 3 shows a cross section (as already explained for FIG. 1) through a different embodiment of the honeycomb body of the invention. The wound stack 6 of smooth sheet metal layers 4 and corrugated sheet metal layers 5, which is located between the inner region 2 and the outer region 3, has a number of windings, all of which are spaced apart from one another by the insulating layers 9. Connections between the windings are present in the form of the individual bridges 7 in the vicinity of the outer region 3 and the inner region 2, and paired bridges 8. Two paired bridges 8 each have angular spacings of 360°, measured about the non-illustrated axis. Electric current flows substantially uniformly through the honeycomb body of FIG. 3, between the inner region 2 and the outer region 3. All of the bridges 7 and 8 are located substantially along a straight line passing through the center point of the cross section (and therefore advantageously, in terms of the entire honeycomb body, in a plane that contains the axis), and the electric current flowing along the stack 6 takes a random course from bridge 7, 8 to bridge 7, 8.

Figure 4:
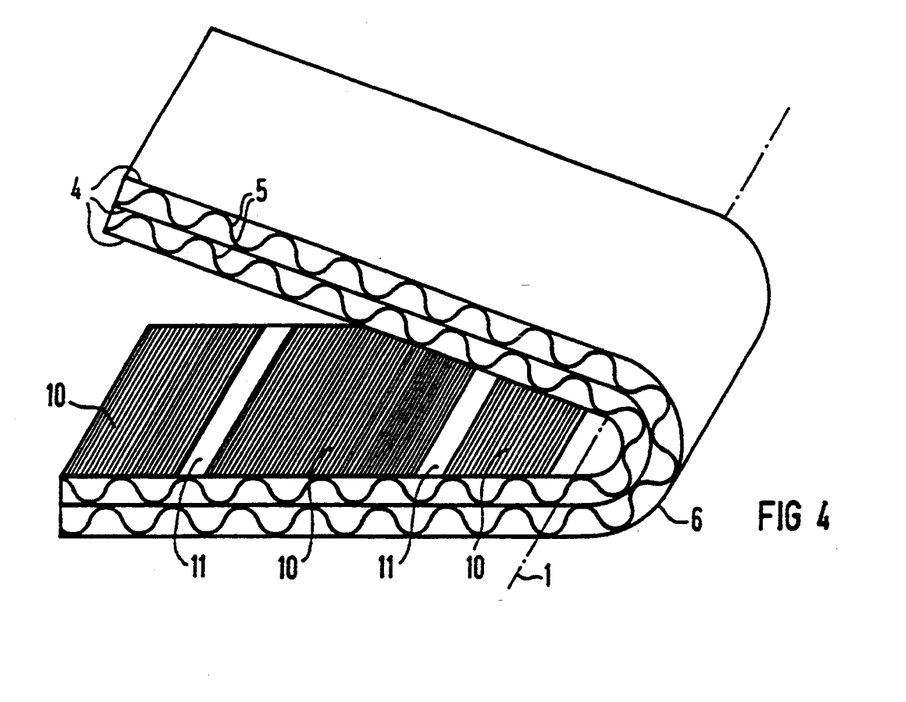
FIGS. 4 and 5 are enlarged perspective views of a stack of smooth and corrugated sheet metal layers for forming a honeycomb body according to the invention.

FIG. 4 shows one possibility for forming a stack 6 of smooth sheet metal layers 4 and corrugated sheet metal layers 5. The configuration of sheet metal layers 4 and 5 is folded around the axis 1. The folded configuration can then be wound spirally around the axis 1. The insulating layer 9 in the exemplary embodiment is a ceramic coating 10 of one of the smooth sheet metal layers 4, namely the sheet that comes to rest on itself in the interior of the folded configuration. The ceramic coating 10 may be applied by plasma spraying or the like, for instance. In order to form the bridges 7, 8, the ceramic coating 10 is provided with recesses 11, in which the coated sheet 4 comes to rest on itself, thereby producing a contact capable of accepting an electrical load. Optionally, the contact in the recesses 11 may be even further improved, if a brazing material or the like is applied to the sheet metal layer at least in the recesses 11, thus forming a brazed connection or the like between two windings of the stack in a heat treatment process that follows the assembly of the honeycomb body. Depending on which heat treatment process is employed, sintering or diffusion welding may also be performed, which is capable of forming an electrically and mechanically adequately good connection and makes it possible to dispense with the use of brazing materials and the like.

Figure 5:
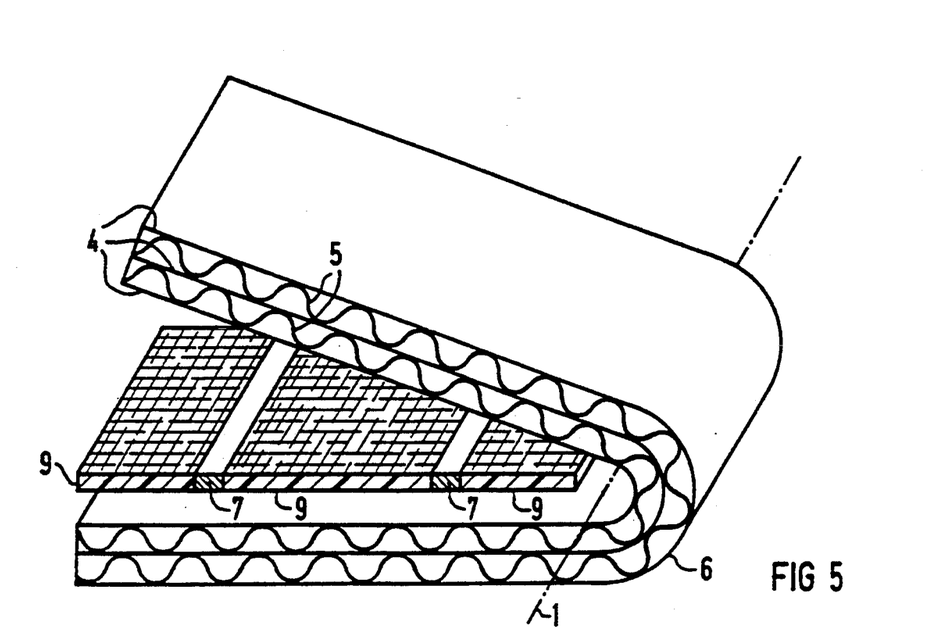

FIG. 5 shows a second option for forming a stack 6 of smooth sheet metal layers 4 and corrugated sheet metal layers 5. Once again, the sheet metal layers 4 and 5 are folded around the axis 1. However, insulating layers 9 of ceramic or mineral material, for instance mats or non-wovens being formed of ceramic or other mineral fibers, as well as bridges 7 in the form of sheet-metal strips or the like, are placed in the interior of the stack 6. The assembly of the honeycomb body is performed as explained in conjunction with FIG. 4. It should be noted that the exemplary embodiments shown in the drawing, with a stack 6 of smooth sheet metal layers 4 and corrugated sheet metal layers 5, in no way represents the only options in achieving the invention. In particular, is possible to use stacks 6 that solely include corrugated sheet metal layers 5, and a plurality of differently corrugated sheet metal layers may optionally also be used. Furthermore, instead of an entirely smooth sheet metal layer 4, a sheet metal layer with a very small "microcorrugation" may be used.

Figure 6:
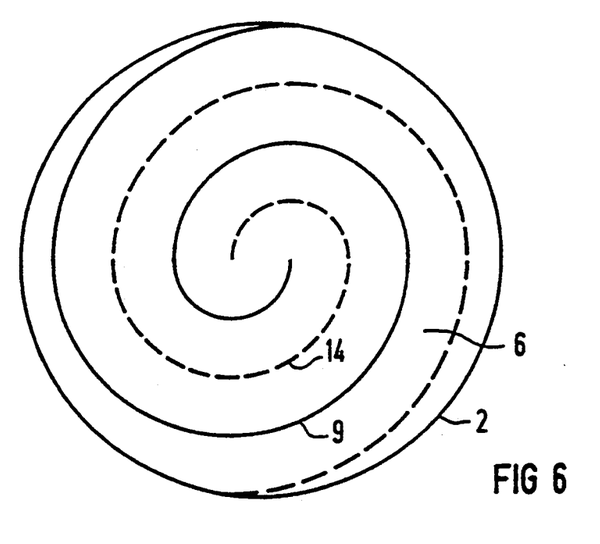
FIG. 6 is a cross-sectional view of an inner region of a honeycomb body that is formed by spirally winding up a stack in accordance with FIG. 4 or FIG. 5.

FIG. 6 shows how the inner region 2 of a honeycomb body formed with a stack in accordance with FIG. 4 or FIG. 5 looks. The insulating layer 9 (which might also be formed by the ceramic coating 10 shown in FIG. 4) is shown as a solid spiral line. An outer boundary 14 of the stack 6 is suggested by a dashed spiral 14. It should be noted that the similarity of a honeycomb body wound from a folded stack 6 to a honeycomb body formed by S-shaped intertwining of a stack, of the kind learned from the prior art references mentioned above, is apparent from FIG. 6. It should also be noted that the invention in no way requires stacks 6 that extend all the way into the inner region 2 of the honeycomb body. In particular, and as already described in the prior art, the inner region 2 may be a component independent of the stack 6 and in which the sheet metal layers 4, 5 forming the stack 6 are suspended. In that case, the stack 6 may receive the windings from involute-like intertwining of the sheet metal layers 4, 5 around the inner region 2. The honeycomb body of FIG. 6 can also be seen to be formed by the winding of two stacks 6 that cohere in the inner region 2. In this sense, windings are partitioned off both by the "boundary" 14 and by the insulating layer 9. Not all of the windings are spaced apart from one another in pairs, but rather two adjacent windings at a time rest directly on one another at the boundary 14.

Figure 7:
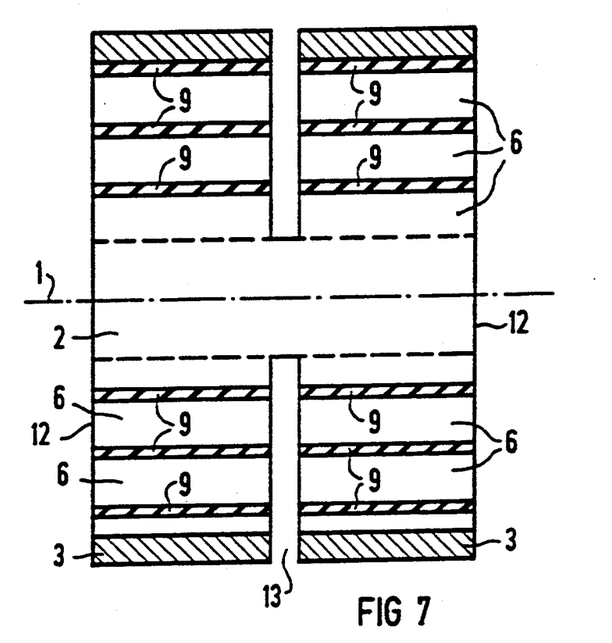
FIG. 7 is a longitudinal-sectional view of a special embodiment of the honeycomb body according to the invention.

FIG. 7 shows a special embodiment of the honeycomb body of the invention in a longitudinal section. The honeycomb body is approximately cylindrical with respect to the axis 1, with end surfaces 12 at right angles to the axis 1. A groove 13 encompassing the axis 1 and extending as far as the inner region 2 is introduced into the outer region 3 and the stack 6 of the honeycomb body. This construction makes it possible to deliver the electric current to and remove it from the honeycomb body on the outside thereof. To that end, the current is delivered to an outer region 3 located on a first side of the groove 13 and is removed again from the outer region located on the other side of the groove 13. Contacts on the inner region 2 of the honeycomb body, which are complicated and expensive to produce and are objectionable in terms of their strength and durability, can thus be dispensed with. It should be noted that in FIG. 7 only insulating layers 9 but not bridges 7 or 8 are shown. The configuration of these bridges is not dependent on the special detail shown in FIG. 7 and may be performed arbitrarily along the lines of the invention, for instance within the context of the options illustrated in FIGS. 1 and 3.

The electrically conductive honeycomb body according to the invention has a current path for carrying an electric current, with an electrical resistance of an advantageous order of magnitude, and it has a structure that has an especially great capacity for mechanical strains.

We claim:

1. An electrically heatable honeycomb body, comprising:
   a) an axis, an inner region surrounding the axis, and an outer region spaced apart from the axis;
   b) at least one stack having at least one sheet metal layer and being disposed between said inner region and said outer region, said stack being wound in the form of a spiral with a multiplicity of windings around said inner region, said windings including a plurality of windings being adjacent one another and spaced apart from one another and electrically insulated, in pairs;

c) a multiplicity of bridges each mechanically and electrically connecting together a respective two of said adjacent and spaced-apart windings;

d) said windings and said bridges forming a multiply branched current path for an electrical current flowing between said inner region and said outer region, and each of said windings being completely part of said current path.

2. The honeycomb body according to claim 1, wherein at most two of said bridges are disposed between each respective two of said adjacent and spaced-apart windings in each angular range of less than 360° measured around the axis.

3. The honeycomb body according to claim 1, wherein
a) each two of said adjacent and mutually spaced-apart bridges have an angular spacing relative to the axis;
b) a sum of each two angular spacings immediately succeeding one another is between approximately 480° and approximately 600°; and
c) at least one angular spacing of each two angular spacings immediately succeeding one another is no greater than approximately 240°.

4. The honeycomb body according to claim 3, wherein each angular spacing is greater than 120°.

5. The honeycomb body according to claim 3, wherein each angular spacing is approximately 240°.

6. The honeycomb body according to claim 3, wherein said angular spacings alternatingly include a first angular spacing between approximately 120° and approximately 240° and a second angular spacing of approximately 360°.

7. The honeycomb body according to claim 6, wherein said first angular spacing is approximately 180°.

8. The honeycomb body according to claim 1, wherein each of said bridges is essentially a strip passing through the honeycomb body parallel to the axis.

9. The honeycomb body according to claim 1, including insulating layers disposed between said bridges between each two of said adjacent and spaced-apart windings.

10. The honeycomb body according to claim 9, wherein said insulating layers are ceramic layers.

11. The honeycomb body according to claim 9, wherein said bridges are formed of sheet-metal strips disposed between said insulating layers.

12. The honeycomb body according to claim 10, wherein said bridges are formed of sheet-metal strips disposed between said insulating layers.

13. The honeycomb body according to claim 9, wherein said insulating layers are ceramic coatings on at least one of said sheet metal layers, and said bridges are recesses between said coatings.

14. The honeycomb body according to claim 10, wherein said insulating layers are ceramic coatings on at least one of said sheet metal layers, and said bridges are recesses between said coatings.

15. The honeycomb body according to claim 1, including:
a) two approximately planar end surfaces being disposed approximately at right angles to the axis and bounding the honeycomb body in the direction of the axis;
b) said outer region having an approximately cylindrical jacket surface being disposed between said end surfaces and being oriented approximately parallel to the axis; and
c) said jacket surface having a groove protruding radially and circumferentially therein approximately midway between said end surfaces as far as said inner region.

16. The honeycomb body according to claim 1, wherein all of said windings are adjacent one another and spaced apart from one another in pairs.

* * * * *